Dec. 7, 1926.
H. A. STEVENS
1,609,323
DIRECTION INDICATOR
Filed June 15, 1925   2 Sheets-Sheet 1
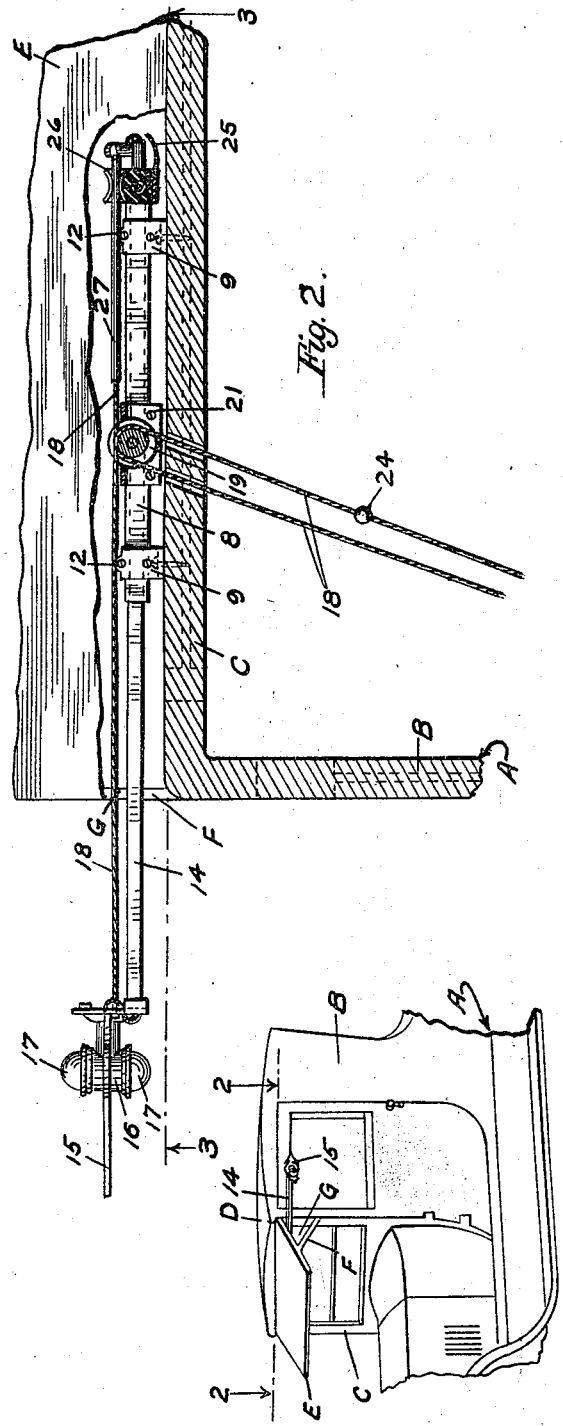
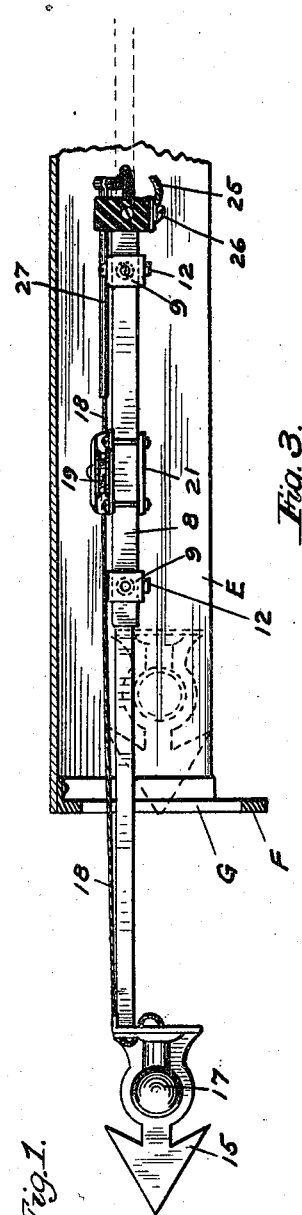
Inventor
By HENRY A. STEVENS
Attorney Dec. 7, 1926.
H. A. STEVENS
DIRECTION INDICATOR
Filed June 15, 1925     2 Sheets-Sheet 2
1,609,323
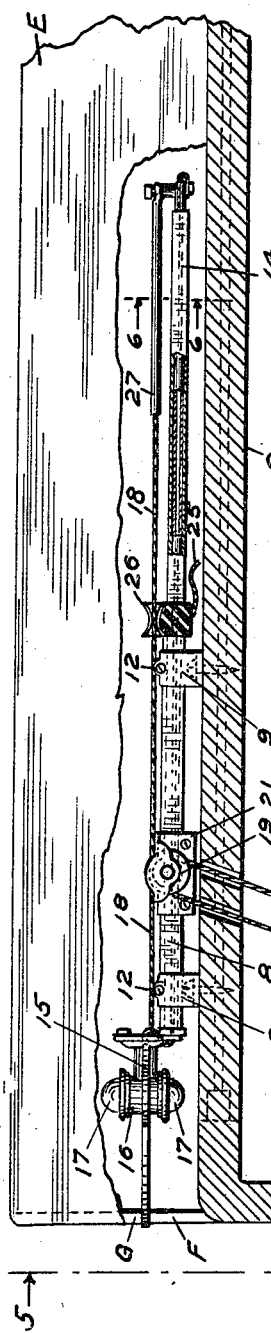
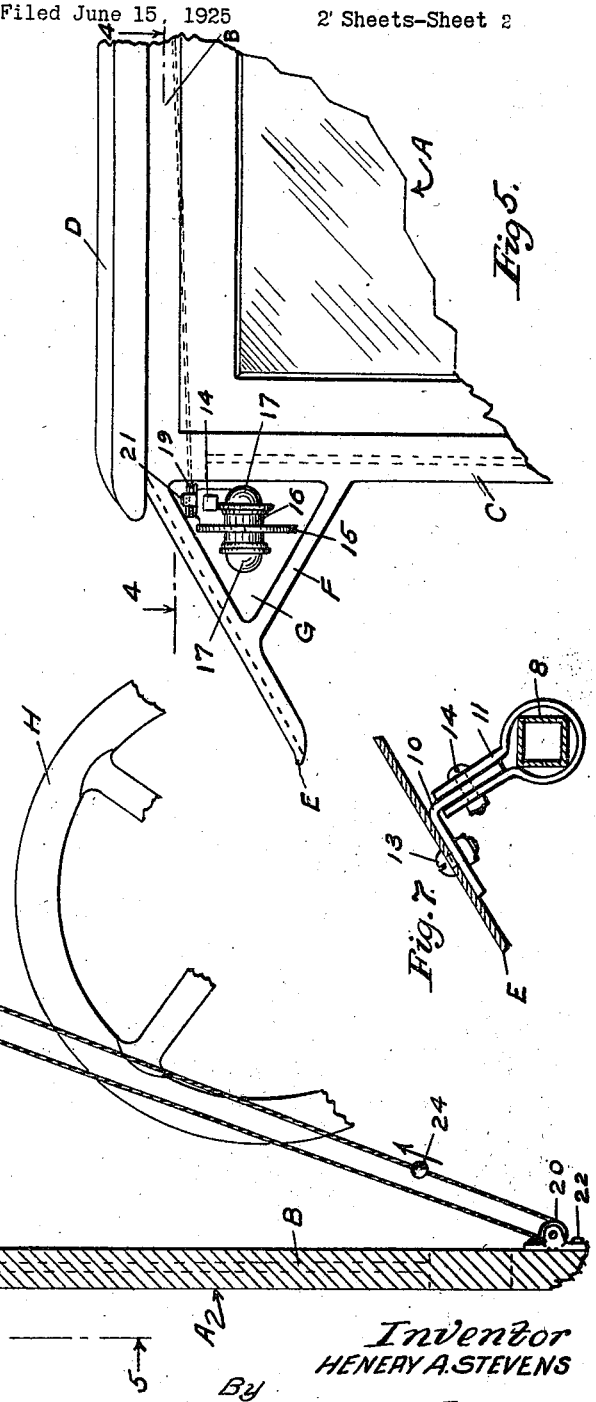
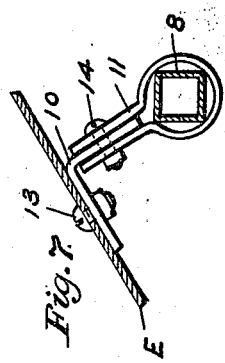
Inventor
HENERY A. STEVENS
By
Attorney Patented Dec. 7, 1926.

1,609,323

UNITED STATES PATENT OFFICE.

HENRY A. STEVENS, OF MINNEAPOLIS, MINNESOTA.

DIRECTION INDICATOR.

Application filed June 15, 1925. Serial No. 37,399.

This invention relates to direction indicators for motor vehicles and the main object is to provide a comparatively simple, practical and efficient device whereby the driver of the car may conveniently and readily operate an indicator so as to signal to pedestrians and other drivers when he is to turn his car at a corner or street intersection. A further object is to provide an indicator of novel construction whereby it may be readily secured upon the car in such a position that it will be almost entirely hidden from view when not in use, and will not therefore disfigure the appearance of the car on which it is used. Still further and more specific objects will be disclosed in the course of the following specification, reference being had to the accompanying drawings, wherein:

Figure 1 is a perspective view of a portion of an inclosed or sedan type of automobile showing the indicator as projecting therefrom in signalling position.

Figure 2 is an enlarged detail sectional view about as on the line 2—2 in Figure 1.

Figure 3 is a detail elevation, partly in section as on the line 3—3 in Figure 2.

Figure 4 is an enlarged sectional view, similar to Figure 2 and as on the line 4—4 in Figure 5, but showing the indicator in its fully contracted position.

Figure 5 is a side elevation of the upper left hand corner portion of the car, showing the relative positions of the indicator and the usual sun visor of the car.

Figure 6 is an enlarged detail section as on the line 6—6 in Figure 4.

Figure 7 is a section detail of the device, showing a modification whereby the indicator may be secured upon the visor of the car when so desired.

Referring to the drawings more particularly and by reference characters A designates an automobile having a side wall or frame B, a front or windshield frame C, a roof D, and a forwardly extending and inclined sun shade or visor E, all of common and well known construction. The visor may be either permanently or detachably secured upon the car, and is provided at each end with a brace rod F, which, with the visor E and frame C forms a triangular opening G through which the indicator operates.

The indicator proper may be described as follows: A sleeve or hollow guide 8, which is preferably square in cross section is secured upon the upper rail of the windshield frame by a pair of brackets 9, as shown in Figures 2, 3, and 4, or, as shown in Figure 7, by brackets 10—11 to the visor E. The brackets 9 may be secured in any desirable position on the frame rail, and are formed as clamps, adapted to be tightened by screws or bolts 12, so that the sleeve 8 may be adjusted to the proper transverse position with respect to the car and the opening G. In the bracket construction shown in Figure 7, the member 10 is rigidly secured on the visor E, by a bolt B, while the clamping member 11, which grips the sleeve 8, is secured by a bolt 14 to a flange of the member 10. The object in either case is to secure the indicator mechanism as far up under the visor as possible so that it will be substantially, if not entirely hidden from view, both as to the occupants of the automobile, and as to those outside of the car.

Slidably arranged in the sleeve 8 is a tubular rod 14 which projects from both ends thereof. On the outer end of this rod 14 is secured the signal head 15 which carries a light receptacle 16 having lenses 17. The head in the present instance, is arrow shaped, but need not necessarily be so in all cases. A novel and very important feature lies in the fact that the signal head 15—16—17 is offset downwardly and forwardly from the arm or rod 14, so that it will clear in the triangular opening when it passes therethrough. If the head 15 was in alignment with the rod 14, it is obvious that it could not operate successfully through the opening G unless the position of mounting mechanism was lowered and advanced, and if that were to be done, it would not be practicable or desirable to secure the device on the frame rail C, nor would the mechanism be out of sight, as is so much desired.

The signal arm 14 is actuated back and forth by a cable or cord 18 the respective ends of which are secured to the ends of the rod, while at intermediate points the cable passes over two pulleys 19 and 20. The pulley 19 is mounted on a bracket 21 which is adjustably secured, for longitudinal adjustment, on the sleeve 8, and the pulley 20 is permanently secured, as at 22, within the car and on the side wall above and to the left of the operator. The cable 18 operates through two holes 23 in the frame rail G, and is provided with a knob or other suitable hand piece 24 which the operator grasps when he desires to actuate the cable. This hand piece 24, it may be observed, is in a very convenient position for the driver to grasp with his left hand, which leaves his right hand free to operate the steering wheel H or other controls of the car. It will thus be seen that when the hand piece 24 is moved forward it will actuate the indicator rod outwardly into signaling position, and when moved backward will retract the indicator into its inactive or concealed position.

The current to the light in the receptacle 16 is provided by a wire 25 which connects with and supplies a suitably insulated terminal 26 adjustably mounted on the member 8. This terminal makes and breaks contact, when the indicator is extended and retracted, with a metallic tube 27, which is secured on the inner end of the tube 14. The tube 27 communicates with the light by a suitable insulated wire 28. The other terminal for the light (not shown) may be either by a ground to the frame of the car or a return wire to the battery, but as such circuit connections are common and well known expedients in the art, they are not here shown or described in detail.

It is understood that various modifications may be made in the general design and structural details of the invention as herein illustrated, and described, providing, however, that such modifications come within the spirit and scope of the appended claims. Having, now, therefore, fully shown and described my invention, what I claim to be new and desire to protect by Letters Patent is:

1. The combination with a vehicle wind shield and a visor forming a triangular recess therewith, of an indicator comprising a transversely arranged rod slidably mounted in said recess, and a signal head at the outer end of said rod, said signal head being offset downwardly and forwardly from the rod, for the purpose described.

2. The combination with a vehicle wind shield and a visor forming a triangular recess therewith, of an indicator comprising a transversely arranged rod slidably mounted in said recess, and a signal head at the outer end of said rod, said signal head being offset downwardly and forwardly from the rod, for the purpose described, and means, including a cable extending into the vehicle for operating the direction indicator.

3. A direction indicator for motor vehicles comprising a signaling arm mounted for longitudinal movement adjacent the upper rail of the windshield frame of the car, a cable for extending and retracting the signal arm and having its ends secured to the respective ends thereof, an intermediate portion of said cabe being formed in a pulley supported loop arranged substantially above and to one side of the driver of the vehicle.

4. A direction indicator for motor vehicles comprising a sleeve-like member adjustably secured upon the body of the car, a signal arm slidably secured in said sleeve, a pulley mounted on said sleeve, a second pulley within the vehicle, and a cable passed over both of said pulleys and having its ends secured to the signal arm, whereby when the cable is actuated in one direction over said pulleys, it will extend the signal arm and when actuated in a reverse direction, it will retract the signal arm.

In testimony whereof I affix my signature.

HENRY A. STEVENS.